May 14, 1963 — A. CHAMOUARD — 3,089,352
MANUFACTURE OF KNIFE BLADES
Filed Sept. 4, 1959 — 4 Sheets-Sheet 1

INVENTOR.
ANDRÉ CHAMOUARD
ATTORNEYS.

May 14, 1963 A. CHAMOUARD 3,089,352
MANUFACTURE OF KNIFE BLADES
Filed Sept. 4, 1959 4 Sheets-Sheet 2

INVENTOR.
ANDRÉ CHAMOUARD
BY
Wolfe, Hubbard, Voit & Osann
ATTORNEYS.

INVENTOR.
ANDRÉ CHAMOUARD
BY
Wolfe, Hubbard, Voit & Osann
ATTORNEYS.

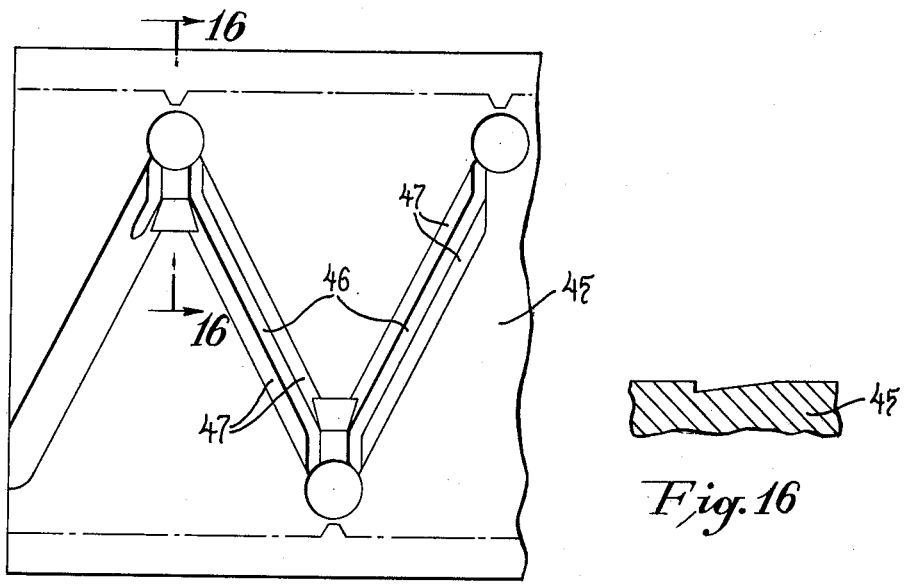
Fig. 15
Fig. 16
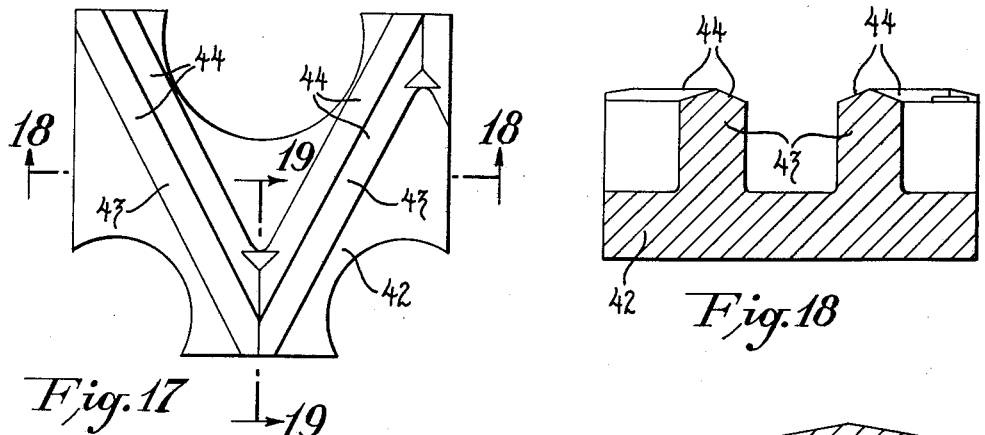
Fig. 17
Fig. 18
Fig. 19
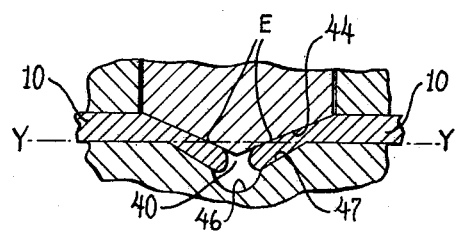
Fig. 20
INVENTOR.
ANDRÉ CHAMOUARD
BY Wolfe, Hubbard, Voit & Osann
ATTORNEYS.

3,089,352
MANUFACTURE OF KNIFE BLADES
André Chamouard, Versailles, France, assignor to Massey-Ferguson, S.A., Marquette-lez-Lille, Nord, France, a corporation of France
Filed Sept. 4, 1959, Ser. No. 838,203
1 Claim. (Cl. 76—101)

This invention relates to the manufacture of knife blades, more especially knife blades sometimes known as blade sections, for attachment to the reciprocating cutter bars of mowing machines.

Usually the knife blades of mowing machine cutter bars have a tip or cutting portion of substantially V-shape, with the sloping edges extending from the parallel sides of a narrow, generally rectangular base. When a series of these blades are attached along a cutter bar, the sides of the bases of adjacent blades abut. The sloping edges of the tip portions of the blades are bevelled to serve as cutting edges, and they may be either smooth or toothed.

The usual method of manufacture is to make the blades individually; that is to stamp out from steel strip the individual blades, including holes in the base portion for attaching them to the cutter bar, and to grind the cutting edges on each individual blade by a further operation. If the cutting edges are to be toothed, the teeth are formed by cutting in rapid succession individual grooves first in one edge and then in the other, the teeth being normal or substantially normal to the cutting edge.

One object of the present invention is to provide an improved method of and means for manufacturing knife blades of the above general character and to provide improvements in the blades themselves.

According to one aspect of the invention the knife blades are made by a method which comprises dividing a steel strip along a sinuous series of disconnected lines to delineate a series of blade sections, deflecting the strip along each side of the dividing lines so that one surface of each deflected portion of the strip projects beyond the plane of the opposite surface of the strip and removing the projecting steel so that the faces left by such removal form cutting edges with the faces of the deflected portions.

According to another aspect of the invention, toothed blades may be made by a modified method which comprises forming a series of disconnected slots in V-disposition along a strip, bending down the edges of the slots so that the upper surface of the bent-down portions is near the plane of the lower surface of the strip, subjecting the bent-down portions to cold forming between serrated dies to produce teeth in relief on both sides of the bent-down portions and then grinding off the undersides of the bent-down portions so that the upper toothed faces of these portions form cutting edges with their lower ground faces.

In carrying out either form of the improved method, the dividing lines or slots which delineate the blade sections in the metal strip are unconnected. The strip therefore remains a single piece throughout the various operations until the final parting of the blade sections, thus facilitating production. The strip may be as long as practicable so as to obtain from it a substantial number of blades by a continuous series of dividing or slotting operations followed by a continuous series of forming operations.

A further object of the invention is to provide a novel die mechanism operative firstly to perform the deflecting or downward bending operation and secondly to perform a tooth-forming operation in each working stroke. Tooth-forming grooves in the dies preferably increase in cross-section towards the edges of the dies so as to form teeth on each blade section which increase in cross-section towards its cutting edges. An ancillary object is to provide a die mechanism in which the walls of tooth-forming grooves on the dies relatively converge towards the edges of the dies so as to exert a wedging effect on the metal which restrains it from flowing over the dies in the direction of the edges but instead causes the steel to flow up and down into the grooves. The grooves in both dies may merge at the edges of the dies so as to form opposed series of sharp gripping points to grip and inhibit the metal from lateral flow. In some cases it is considered desirable that the teeth on the knife blades should be asymmetrical in cross section, that is with a short steep flank to act in the cutting direction on the crop. This tooth form can be attained by making conformable grooves in the dies, each such groove being walled by a shorter steeper side and a longer flatter side.

According to still another aspect of the invention the improved method of making knife blades from a blank including a V-shaped portion on which the cutting edges are to be formed may be varied to include the steps of bending the sides of said portion from one surface of the blank to project beyond the plane of the opposite surface of the blank and grinding off the projecting metal to form the required side edges. In the case where teeth are desired, the bent edges may also be subjected to a cold forming process by interacting dies.

The invention also resides in the improved knife blades made according to the foregoing methods of manufacture.

The invention will now be described by way of example with reference to the accompanying drawings in which:

FIG. 15 is a face view of one of the dies operative to form toothless blade edges.

FIG. 16 is a fragmentary sectional view taken in a plane substantially on the line 16—16 of FIG. 15.

FIG. 17 is an end view of the die or matrix cooperating with the die shown in FIG. 15.

FIG. 18 is a fragmentary sectional view on an enlarged scale taken in the plane substantially on the line 18—18 of FIG. 17.

FIG. 19 is an enlarged fragmentary sectional view taken in a plane substantially on the line 19—19 of FIG. 17.

FIG. 20 is a fragmentary sectional view showing the blade edges engaged between the dies shown in FIGS. 15 and 17.

Figures 1, 2:
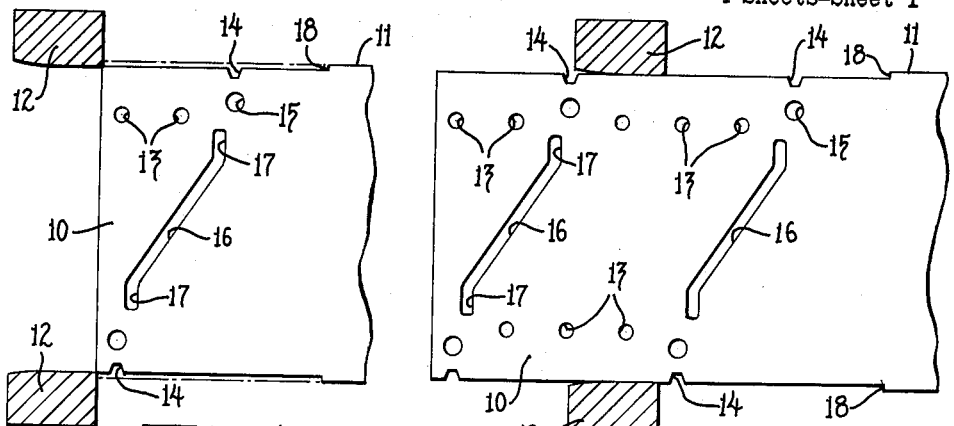
FIGURE 1 is a fragmentary plan view of a metal strip following the first of a series of punch operations constituting steps in an improved method of manufacturing knife blades.
FIGURE 2 is a fragmentary plan view of the strip shown in FIGURE 1, following the second of the series of punching operations.

In manufacturing blades in accordance with the invention, a steel strip 10 of sufficient length to produce a plurality, for example fifty blades, is fed in steps through a punching machine to present successive areas to a punching die mechanism. The sides of the original full-width strip are indicated by 11. FIG. 1 illustrates the effect of the first punching operation, during which the end of the strip 10 is located against stops 12 and the leading blade area is presented to the first set of punches of the die mechanism. The full lines in this view show the work done, which consists of trimming off the sides 11, punching holes 13, these being the holes for attachment of the finished blades to the back of the cutter bar for actual use, forming notches 14 which subsequently serve as feed notches in later operations, punching larger holes 15 for locating purposes in subsequent operations, and forming an oblique slot 16 with transverse end portions 17.

FIG. 2 shows the next punching operation, for which the strip 10 is advanced a step between the stops 12, 12 to bring shoulders 18 formed by the trimming of the sides 11 against the stops and present the second blade area to the punch set which previously acted on the first blade area. The work done by this second operation is a duplicate of that done in the first operation and is spaced along the strip to conform to the position of the second blade.

Figure 3:
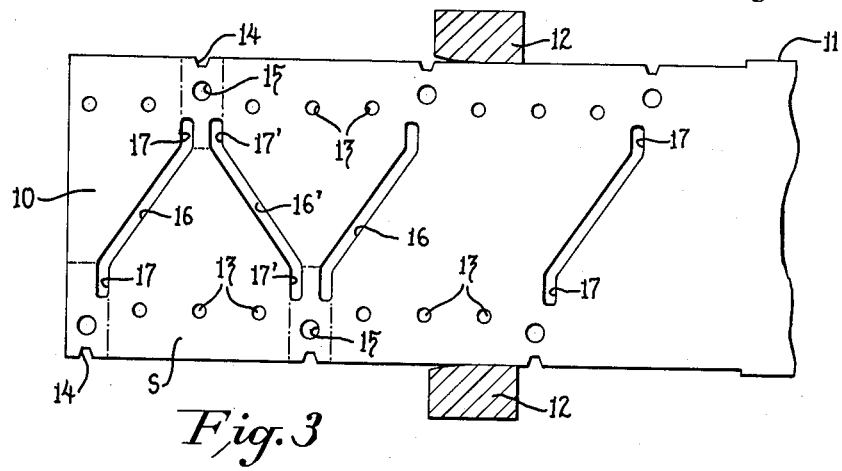
FIGURE 3 is a fragmentary plan view of the strip shown in the preceding figures following the third of a series of punching operations.

FIG. 3 illustrates the third operation performed after a further step of the strip 10 to present the third blade area to the punch set which previously operated on the first and second areas. In this step the first blade area is presented to the second punch set of the die mechanism. This third operation is the first complete operation of the punching means on the strip and includes the punching of an oblique slot 16' sloped oppositely to the slot 16. Slot 16' has transverse end 17' parallel to the ends 17 of the companion slots. It will be noted that the substantially triangular portion of the first blade section S has now been delineated by the dividing slots 16 and 16'. Further sections will be similarly delineated throughout the length of the strip 10 as the operations proceed as a continuous series, step by step, until the entire strip has been punched.

The next series of operations and the means for performing them are illustrated by FIGS. 4 to 11. These operations are performed in a press capable of exerting substantial pressure. In each operation, the V-form sides of adjacent blade sections are subjected firstly to a bending action and secondly to a cold-forming moulding action. The press is equipped with complementary dies, the upper of which may be called for convenience of description a forming tool and the lower of which may be called a matrix. The particular forming tool 21 shown in FIG. 5 includes a pair of punches 22 arranged in substantially V-formation. The upwards inclined faces 23 of each punch are serrated, being formed with grooves 24 which will be described in more detail later on. At their outer ends the punches terminate in triangular facets 25 and at their apex ends they similarly terminate in triangular facets 26. Each of these facets 25, 26 inclines towards the base of the punch.

Figure 9:
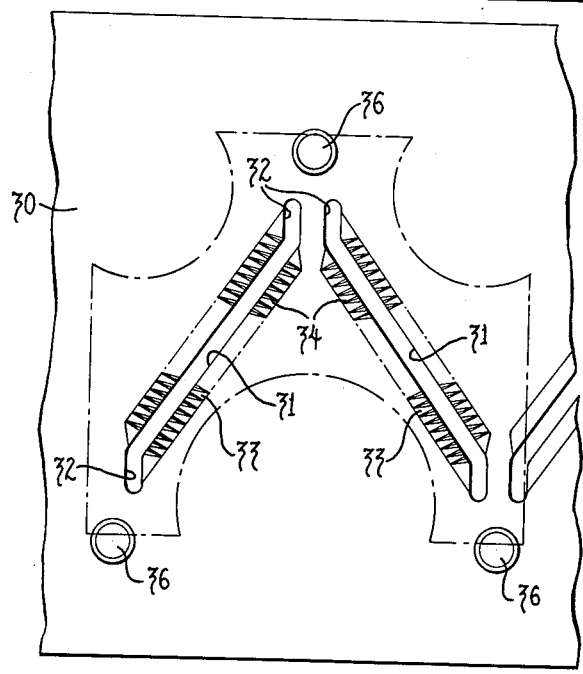
FIG. 9 is an enlarged plan view of the companion die or matrix for operation with the die shown in FIG. 5.

The complementary die, namely the matrix 30 shown in FIG. 9, has recesses or channels 31, 32 which conform generally to the configuration of the adjacent slots 16 previously formed in the strip 10. Furthermore, the matrix has downwards inclined faces 33 in which are formed grooves 34 which will also be described in further detail. On the matrix there are also provided three pins 36 for cooperation with the sets of three corresponding holes 15 on the strip in order to locate the latter accurately in the press at the end of each step.

Figure 8:
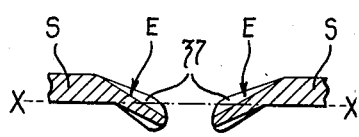
FIG. 8 is a fragmentary sectional view taken through the area of the strip acted on by the forming die shown in FIGS. 5 and 7.
Figure 10:
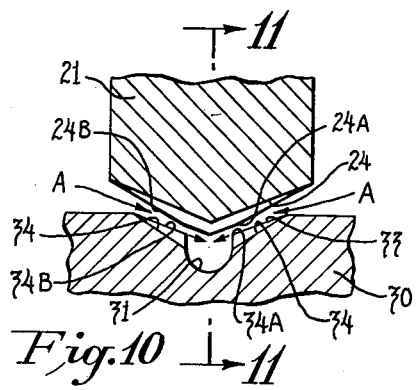
FIG. 10 is an enlarged fragmentary sectional view of the relative positions of the two dies for forming the blade edges to the shape shown in FIG. 8.

At the end of each working stroke of the press, the forming tool 21 and the matrix 30 finally assume the relative positions shown in FIG. 10. During the working stroke, two operations are performed. The first of these consists in bending down the side edges E of the blade sections S delineated by the slots 16, so that the upper surfaces of the bent-down portions of the strip are caused to project below the plane of the lower surface of the strip as shown in FIG. 8. The second operation, which takes place towards the end of the stroke, is a cold-forming operation in which the teeth 37 are moulded by the cooperating walls of the grooves 24, 34 in the forming tool and matrix. Since this is a cold forming operation it requires substantial pressure, for example about one hundred and seventy kilograms per square millimetre. Consequently, there is an inherent danger of excessive wear of the dies. Such danger is avoided or minimized by arranging that the operation causes no, or substantially no, lateral displacement of the molecules of the steel. Various factors contribute towards this result.

Figure 11:
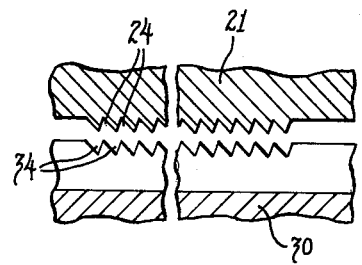
FIG. 11 is an enlarged fragmentary sectional view through the dies taken in a plane substantially on the line 11—11 of FIG. 10.

Firstly, seeing that the dies are complementary, the grooves 24 in the forming tool alternate with the grooves 34 in the matrix, as FIG. 11 shows, and the walls of the cooperating grooves accommodate up and down movement of the molecules rather than horizontal movement either across or along the strip. Moreover, the formation of the grooves 24, 34 is such that they increase in cross-sectional area, that is both in width and depth, towards the edges of the slots, this formation further contributing towards the up-and-down molecular movement. This formation will be clear by reference to FIGS. 8, 10 and 13 from which it will be seen that the cross-section of the teeth 37 formed above and below in the blade section increases towards its cutting edges.

Figure 12:
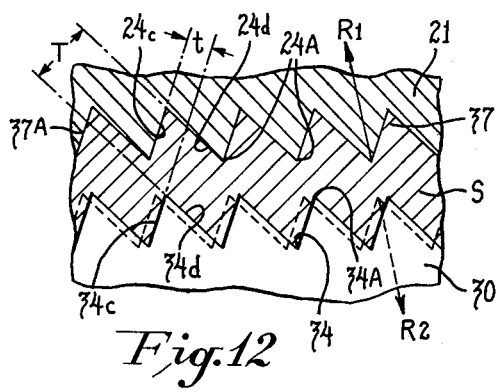
FIG. 12 is a fragmentary sectional view on an enlarged scale showing a form of die for producing teeth of asymmetrical cross-section on the blade edges.

Another factor is that the edges of the grooves 24 in the forming tool merge and form points as at 24A (see FIG. 12). Similarly the grooves 34 in the matrix merge and form points as at 34A. These opposed rows of points bite into the metal of the blade section and tend to prevent displacement of the metal laterally.

Yet another factor is that the sides of the triangular faces 24B and 34B between the grooves 24 and 34, respectively, converge towards the edges of the slots 16, thus forming as it were wedge-form gaps A, A, FIG. 10, between the serrations on the forming tool 21 above and the matrix 30 below. The wedge-form gaps inhibit the flow of the metal through them in the direction of the arrows (FIG. 10) and in effect the faces 24B, 34B act like restraining walls in the dies. Thus, the metal is constrained to flow up and down into the grooves 24, 34 and form sharp edges on the teeth 37.

Figure 13:
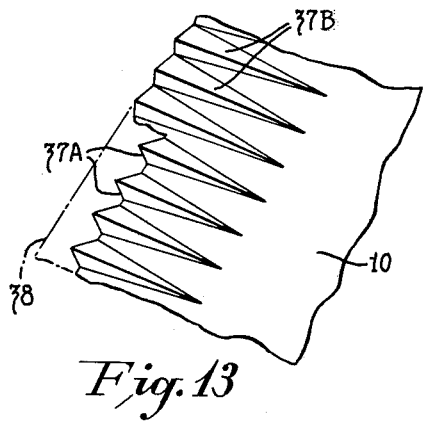
FIG. 13 is a fragmentary perspective view of a blade showing the toothed edge prior to and after the grinding operation.

As FIG. 11 shows, the grooves 24 of the forming tool 21 are each walled by a short steep side and a longer less steep side so as to produce in the finished knife blade an asymmetrical tooth form including a short steep flank which in use on a cutter bar faces in the cutting direction against the crop and a longer, flatter flank facing in the opposite direction. In FIG. 13, the short steep flanks are indicated by 37A and the longer, flatter flanks by 37B.

This tooth form is preferred because of its strength. However, the moulding of such an asymmetrical tooth form creates difficulties in the forming operation. Because of this form, the reaction of the blade metal on the dies will tend to bend their serrations towards the short steep sides. However, towards the end of each stroke of the press, when the moulding pressure becomes heaviest and the danger of damage under the bending forces on the serrations is greatest, a compensating factor emerges. As FIG. 12 shows, because of the asymmetrical tooth form the thickness $t$ of metal between opposing short steep sides 24c, 34c of the grooves of the respective dies is less than the thickness T between the opposing longer sides 24d, 34d of said grooves. Now, the thinner metal offers greater resistance to further deformation than the thicker metal. Therefore, the reaction to the die pressure, at first comparatively light and vertical, becomes inclined as the pressure rapidly increases towards the stroke end. This inclination from vertical, although beneficial, is less than optimum. A more effective result can be got by offsetting the matrix 30 slightly in relation to the forming tool 21, as illustrated diagrammatically by the dotted lines in FIG. 12, so as to increase the difference between the two thicknesses T and $t$. The optimum offset is such that the resultant reactions R1 and R2 of the metal on the dies bisect the apex angles of the serrations. Under such conditions the serrations are well able to withstand the heaviest pressures.

The next operation on the strip 10 is a grinding operation, in which the strip is ground on its bottom surface along the plane X—X, FIG. 8, to remove the downwardly projecting edges E of the blade blanks adjacent the slots 16 and thus in effect produce the bevelled cutting edge E.

Figure 4:
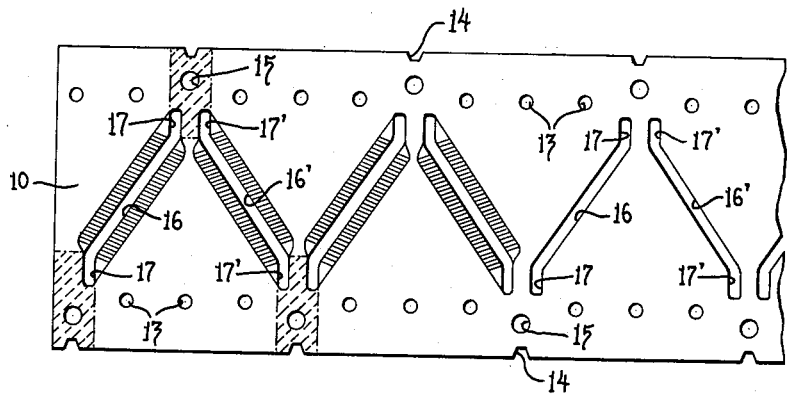
FIG. 4 is a fragmentary view of the strip showing the condition after a forming operation which follows the punching operation and constitutes another step in the improved method of manufacture.
Figure 5:
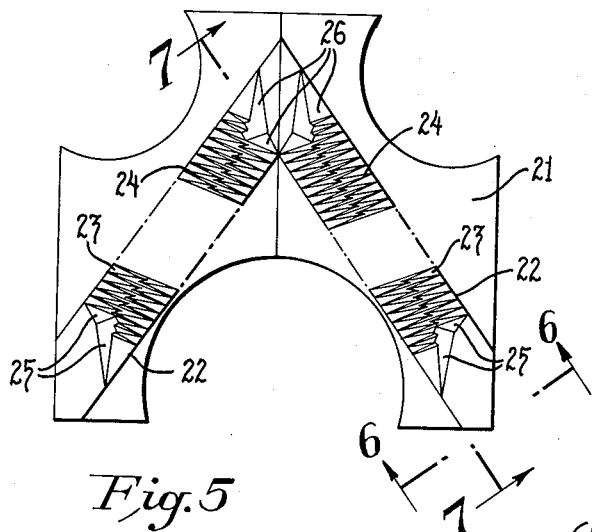
FIG. 5 is a plan view on an enlarged scale of the face of one of the forming dies utilized in carrying out the method.
Figure 6:
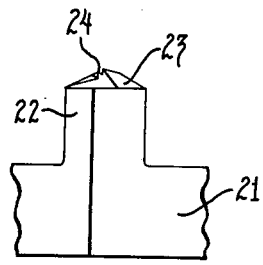
FIG. 6 is an enlarged fragmentary end view of the die taken in a plane substantially on a line 6—6 of FIG. 5.
Figure 7:
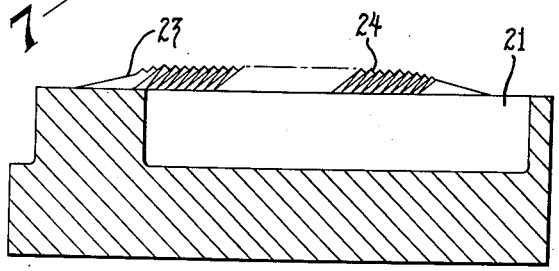
FIG. 7 is an enlarged view partially in section taken in a plane substantially on a line 7—7 in FIG. 5.

Thereafter the strip is subjected to a sand blasting or like operation to remove burrs and the like and finally the strip is machined to part off the sections S as the individual knife blades. The hatched areas in FIG. 4 represent the metal cut away in this final operation.

In FIG. 13, the upper portion shows the teeth of a blade section prior to the grinding operation and the lower portion shows them after a portion 38 has been removed by the grinding.

Figure 14:
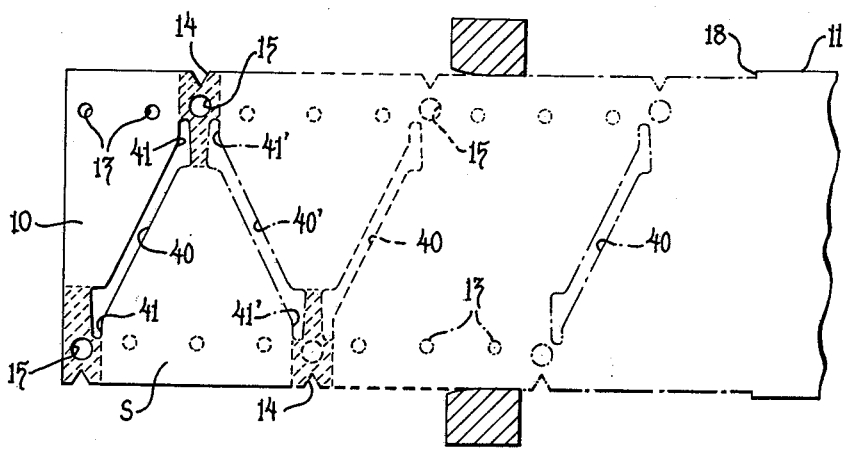
FIG. 14 is a plan view of a partially punched strip.

FIGS. 14–20 illustrate the method and means for forming an alternative type of blade in which the bevelled edges of the knives are smooth, that is, without teeth. The first punching operation is similar to that already described with reference to FIGS. 1 to 3. The full lines, dotted lines and dash-dot lines in FIG. 14 show respectively the work done during the first three feed steps. As before, this operation trims the sides 11 and punches the fixing holes 13, the feed notches 14, the locating holes 15 and the slots 40, 40′, and their end sections 41, 41′, which slots and sections differ slightly in shape only from the slots 16, 16′ and sections 17, 17′ of FIGS. 1 to 3. As before, the hatched areas represent the metal finally cut away when parting off the sections S as knife blades.

The dies shown in FIGS. 15 to 20 are substantially similar to those already described except that no provision is made for forming teeth on the blade sections. Thus, as shown in FIGS. 17 and 18 the forming tool 42 is of substantially V-shape in plan view to conform to the slots 40, 40′ and incorporates a pair of punches 43 with inclined faces 44. Similarly the matrix 45 in FIG. 15 has the channels or recesses 46 and inclined faces 47 and also a clearance channel to accommodate a previously pressed part. FIG. 16 shows the profile at the apex of the matrix, and FIG. 19 shows the profile at the apex of the punches.

As illustrated by FIG. 20, the forming action consists firstly in bending down the edges E of the blade at the sides of the slots 40, 40′ and then cold forming, the cross-sectional shape of the moulded knife-section edge being shown. In contrast with the previous example, the die faces 44 and 47 diverge towards the edges of the slot. This divergence has two purposes, firstly to permit lateral flow of the portion of the metal which is ultimately ground off in a subsequent operation and secondly to cause a restriction to flow at the zone in which the cutting edge E is finally located. This restriction has the effect of strongly squeezing the material in the zone of the final cutting edge with beneficial results. Thereafter the bottom of the strip is ground along the plane Y—Y (FIG. 20) to form the cutting edge E, after which the strip may be sand blasted or similarly finished and the sections are parted off as knife blades.

The invention provides a rapid and economical method of producing mower knife blades of either of the types described. Moreover the cold forming which takes place, especially in the case of toothed blades, under high pressure produces energetic deformation (corroyage), refinement of the grain and orientation of the fibre such that unusual resilience is acquired, so much so that in spite of the intentionally great hardness the cutting edges, and the teeth if formed, are more liable to bend than break under shock. Thus the blades are well adapted to resist wear. It will be appreciated, of course, that the blades may be heat treated, if desired, to increase hardness. The metal of the strip may be cold rolled steel, bright annealed, cleaned and oiled.

I claim as my invention:

The method of producing knife blades of the type having a triangular cutting section from an elongated strip of metal which comprises the steps of punching a series of spaced slots along the strip with the slots disposed at an angle to the longitudinal axis of the strips and with alternate slots sloping in opposite directions to delineate the triangular sections of a plurality of blades, pressing the strip between opposed dies having cooperating faces sloped to deflect the edge portions of the sections from the plane of the strip, said die faces having a series of grooves normal to the edge of the blade sections and terminating in sharp points effective to grip the metal of the sections and inhibit lateral flow of the metal as the dies are pressed together to form teeth in the blade sections, grinding off the deflected edge portions to present a face flush with the adjacent surface of the strip and intersecting the opposite face of the edge portion to form a sharp cutting edge, and severing the individual blades from the strip.

References Cited in the file of this patent
UNITED STATES PATENTS

| | | |
|---|---|---|
| 513,834 | Smith | Jan. 30, 1894 |
| 922,058 | Squair | May 18, 1909 |
| 2,047,300 | Warner | July 14, 1936 |
| 2,182,067 | Bruecker | Dec. 5, 1939 |
| 2,378,041 | Sebell | June 12, 1945 |
| 2,535,406 | Gehred | Dec. 26, 1950 |
| 2,544,447 | Dodds | Mar. 6, 1951 |
| 2,603,987 | Lyon | July 22, 1952 |
| 2,715,262 | Szady | Aug. 16, 1955 |